(12) United States Patent
Findeisen et al.

(10) Patent No.: US 8,037,477 B2
(45) Date of Patent: Oct. 11, 2011

(54) EFFICIENT DETECTION OF SOURCES OF INCREASING MEMORY CONSUMPTION

(75) Inventors: Piotr Findeisen, Plano, TX (US); Yanhua Li, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1259 days.

(21) Appl. No.: 11/657,493

(22) Filed: Jan. 23, 2007

(65) Prior Publication Data

US 2008/0178189 A1    Jul. 24, 2008

(51) Int. Cl.
*G06F 9/46* (2006.01)
*G06F 13/00* (2006.01)
*G06F 11/00* (2006.01)
*G06F 9/44* (2006.01)

(52) U.S. Cl. ........ 718/104; 717/127; 717/128; 711/153; 711/154; 714/39; 714/702

(58) Field of Classification Search ............ 718/104
See application file for complete search history.

(56) References Cited

U.S. PATENT DOCUMENTS

| | | | |
|---|---|---|---|
| 5,561,786 A | 10/1996 | Morse | |
| 5,590,329 A | 12/1996 | Goodnow, II et al. | |
| 6,526,421 B1 | 2/2003 | Houldsworth | |
| 6,640,290 B1 | 10/2003 | Forin et al. | |
| 6,658,652 B1 * | 12/2003 | Alexander et al. | 717/128 |
| 6,763,440 B1 | 7/2004 | Traversat et al. | |
| 6,892,378 B2 * | 5/2005 | Curtis et al. | 717/127 |
| 7,234,080 B2 | 6/2007 | Cirne et al. | |
| 7,398,369 B2 * | 7/2008 | Dickenson | 711/170 |
| 7,426,731 B2 * | 9/2008 | Findeisen | 718/104 |
| 7,487,321 B2 * | 2/2009 | Muthiah et al. | 711/170 |
| 7,496,615 B2 * | 2/2009 | Broussard | 1/1 |
| 7,765,528 B2 | 7/2010 | Findeisen et al. | |
| 2004/0078540 A1 * | 4/2004 | Cirne et al. | 711/170 |
| 2005/0076184 A1 | 4/2005 | Schumacher | |
| 2005/0091646 A1 * | 4/2005 | Chilimbi et al. | 717/130 |
| 2005/0204341 A1 * | 9/2005 | Broussard | 717/124 |
| 2005/0204342 A1 * | 9/2005 | Broussard | 717/124 |
| 2006/0136530 A1 * | 6/2006 | Rossmann | 707/206 |
| 2006/0206885 A1 * | 9/2006 | Seidman et al. | 717/148 |
| 2006/0212852 A1 * | 9/2006 | Hwang | 717/127 |
| 2006/0253845 A1 | 11/2006 | Achanta et al. | |
| 2006/0259528 A1 | 11/2006 | Dussud et al. | |

(Continued)

OTHER PUBLICATIONS

U.S. Appl. No. 11/232,330, Office Action dated Nov. 12, 2008, pp. 1-12 and enclosures.

(Continued)

*Primary Examiner* — Meng An
*Assistant Examiner* — Jennifer To (57) ABSTRACT

A method for detecting increasing memory consumption of an application program is provided. The method includes monitoring memory consumption at an allocation site and updating an allocation site threshold value each time the memory consumption increases. The method further includes increasing a growth period counter each time the allocation site threshold value increases in a current time period. The method yet also includes comparing the growth period counter to a growth threshold. The method yet further includes, if the growth period counter is greater or equal to the growth threshold, computing an elapse time, which is the time between the current time period and a previous growth period. The method moreover includes comparing the elapse time to a time threshold. The method in addition includes, if the elapse time is less than the time threshold, reporting the allocation site as a potential source of the increasing memory consumption.

22 Claims, 4 Drawing Sheets

U.S. PATENT DOCUMENTS

2007/0027942 A1  2/2007  Trotter
2007/0067758 A1* 3/2007  Findeisen et al. ............. 717/140
2008/0034349 A1* 2/2008  Biswas et al. ................. 717/121
2008/0178189 A1  7/2008  Findeisen et al.

OTHER PUBLICATIONS

U.S. Appl. No. 11/232,330, Final Office Action dated Apr. 17, 2009, pp. 1-18 and enclosures.

U.S. Appl. No. 11/232,330, Office Action dated Aug. 4, 2009, pp. 1-14.

David Rubinstein, "Making Applications Behave in Production Environments", SD Times Software Development Magazine, Feb. 15, 2003, Path Communications.

* cited by examiner

EFFICIENT DETECTION OF SOURCES OF INCREASING MEMORY CONSUMPTION

CROSS REFERENCE TO RELATED APPLICATIONS

The present invention is related to the patent application entitled "Identifying Sources of Memory Retention," by Findeisen et al., application Ser. No. 11/232,330, filed on Sep. 21, 2005, now U.S. Pat. No. 7,765,528, which is incorporated herein by reference.

BACKGROUND OF THE INVENTION

Advances in technology have proliferated computer usage. Today, computer systems have become an integral part of everyday life. As modern society becomes more dependent upon computer systems, time and resources are being spent in order to assure the continual growth in the computer industry by minimizing users' frustration and increasing users' trust in the computer system.

A common problem that has frustrated users and has undermined the trust in the computer system is application failure. An application failure may occur when memory is insufficient in a computer system. In computer processing, memory is a limited resource that typically has to be shared among the various different applications of a computer system. During processing, one or more portions of memory may be allocated to an application program. In an ideal situation, the application program may release one or more portions of memory that are not being utilized by the application program thus enabling the freed portions of memory to be available for re-allocation.

Releasing one or more portions of memory may be performed by the application program or by an automatic memory management system. An application program may provide explicit instructions to release one or more portions of memory that are not being utilized by the application program. However, the dependence upon the application program to provide the necessary instruction for memory management may be susceptible to programming errors. In an example, a programmer may forget to provide instruction for performing memory management in one section of the code. As a result, one or more portions of memory may be held even though the memory may not be utilized nor needed resulting in memory leak. A memory leak can cause poor application performance or even application failure.

Some programming languages, such as Java, have implemented automatic memory management system (e.g., garbage collection) to dynamically handle memory management. With automatic memory management system, unused portions of memory are released in order to be re-allocated by the application in the future. By implementing automatic memory management system, memory management is no longer dependent upon the skill of the programmers to assure that unused portions of memory are released in a timely manner. However, even automatic memory management systems may be unable to prevent increasing memory consumption by an application if the total amount of memory occupied by objects referenced by the application grows over time. Increasing memory consumption generally occurs due to flaws in the application logic. In an example, the application program may have failed to designate a size limit to a data structure, such as a cache. As a result, the cache may grow without limits resulting in increasing memory consumption.

Traditional tools for increasing memory consumption analysis (e.g., Wily's Leak Hunter, Mercury's Diagnostics, etc.) usually focus on detecting growing Java collection objects. In an example, memory analysis tools may track individual collection objects. If a collection object grows too fast, too large, or for a long time, the tools may report the collection object as a potential source of memory leak. With these tools, a collection object's growth may have to surpass a threshold (e.g., time, size, etc.) before the collection object is identified as a potential memory leak.

In another example of an increasing memory consumption, a Java collection A may be created. After processing has been performed, the Java collection A may have been garbage collected. However, before the Java collection A has been garbage collected, another Java collection B may have been created and the content of the previous Java collection A may have been copied into the new Java collection B. Thus, if these actions are performed repeatedly by an application, even though the previous Java collection may have been garbage collected, each time a new Java collection is created the size of the Java collection may be growing. The growth of each new Java collection may continue without restraint until an application failure/abort occurs.

The task of identifying the root causes of increasing memory consumption can be tedious and time consuming. Further, the task of identifying increasing memory consumption in a large business critical environment, such as a deployed Internet server environment, can be especially difficult. In such a critical environment, programmers generally do not have the luxury of shutting down the application program in order to identify the source of the increasing memory consumption. However, if the root cause of the increasing memory consumption is not identified, an increased demand on limited memory resources may slow down the application and ultimately cause total application failure.

SUMMARY OF INVENTION

The invention relates, in an embodiment, to a method for detecting increasing memory consumption of an application program in a computer system. The method includes monitoring memory consumption at an allocation site. An allocation site is a location in the application program where a new object is created. The method also includes updating an allocation site threshold value each time the memory consumption at the allocation site increases. The method further includes increasing a growth period counter each time the allocation site threshold value increases for the allocation site in a current time period. The method yet also includes comparing the growth period counter to a growth threshold. The method yet further includes, if the growth period counter is greater or equal to the growth threshold, computing an elapse time, which is the time between the current period and a previous growth period. The method moreover includes comparing the elapse time to a time threshold. The method in addition includes, if the elapse time is less than the time threshold, reporting the allocation site as a potential source of the increasing memory consumption.

In another embodiment, the invention relates to an article of manufacture comprising a program storage medium having computer readable code embodied therein. The computer readable code is configured to detect increasing memory consumption of an application program in a computer system. The article of manufacture includes computer readable code for monitoring memory consumption at an allocation site, which is a location in the application program where a new object is created. The article of manufacture also includes computer readable code for updating an allocation site threshold value each time the memory consumption at the allocation site increases. The article of manufacture further includes computer readable code for increasing a growth period counter each time the allocation site threshold value increases for the allocation site in a current time period. The article of manufacture yet also includes computer readable code for comparing the growth period counter to a growth threshold. The article of manufacture yet further includes computer readable code for computing, if the growth period counter is greater or equal to the growth threshold, an elapse time, which is the time between the current period and a previous growth period. The article of manufacture moreover includes computer readable code for comparing the elapse time to a time threshold. The article of manufacture in addition includes computer readable code for reporting, if the elapse time is less than the time threshold, the allocation site as a potential source of the increasing memory consumption.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1A:
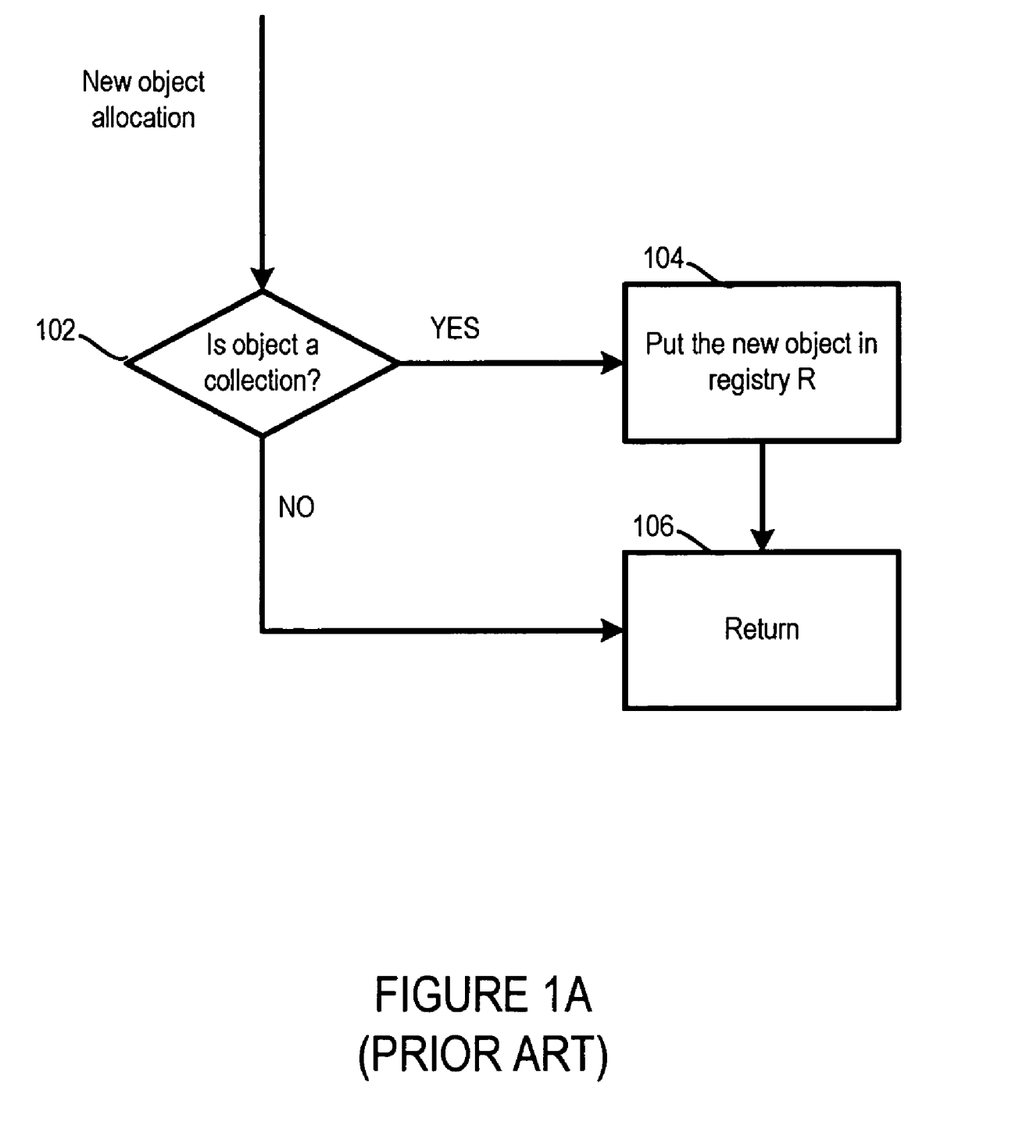
FIG. 1A show a prior art flow chart example of a way a traditional memory analysis tool interfaces with the application by tracking Java collection objects.

As aforementioned, traditional memory analysis tools have focused on tracking growing Java collection objects and identify growth attributes (e.g., time, size, rate, etc.) that surpass a threshold. To facilitate discussion, prior art FIG. 1A shows an example of a flow chart illustrating how a traditional tool reacts to a new collection created by the application. Consider the situation wherein, for example, a new object allocation has occurred in the application program.

At a first step 102, the tool may check to determine if the new object is a collection, which is a class that is capable of storing one or more data items.

If the new object is not a collection, then at a next step 106, the program may continue processing.

If the new object is a collection, then at a next step 104, the new object is placed into the registry (R) maintained by the tool. Those skilled in the art are aware that an implementation of the registry (R) is possible, for example, by using Java weak references or by methods beyond Java programming language. After the new object is placed into registry (R), the program continues processing at next step 106.

Figure 1B:
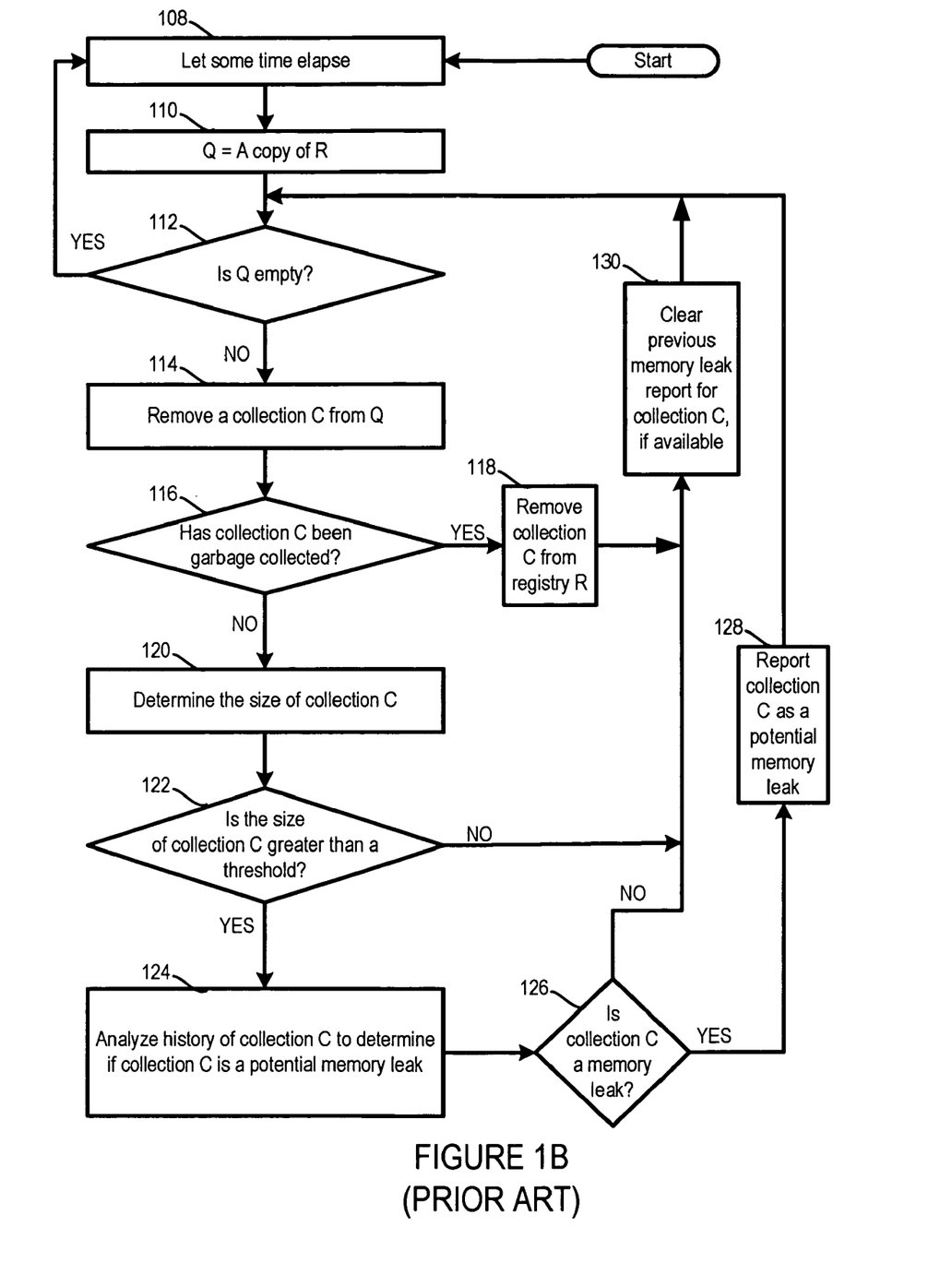
FIG. 1B shows a prior art example of a flow chart implementing a memory analysis tool for detecting potential memory leak.

Prior art FIG. 1B shows an example of a flow chart implementing a memory analysis tool for detecting potential memory leak. Since the tool may scan the registry periodically for potential memory leaks, some time may elapse between iterations, as shown in a next step 108.

At a next step 110, the memory analysis tool may make a copy of the registry (R). In an example, a copy of registry (R) is placed into queue (Q). A copy of the registry (R) is employed in order to prevent unintentional changes to the registry (R).

At a next step 112, the memory analysis tool may check to determine if queue (Q) is emptied or if queue (Q) currently holds at least one collection (C). If the queue (Q) is emptied, no further processing is needed since there remains no unexamined collection (C). Thus, the method may proceed back to step 108 to wait for the next memory analysis iteration. If the queue (Q) is not emptied, then at a next step 114, any (e.g., first) collection (C) is extracted for analysis and removed from queue (Q).

At a next step 116, the memory analysis tool may check to determine if the collection (C) has been garbage collected. If the collection (C) has already been garbage collected, the tool may remove the collection (C) from registry (R), at a next step 118. Then the tool may proceed to a next step 130 to clear any previous report about collection C before returning back to next step 112 to analyze any remaining collection from the queue (Q). However, if the collection (C) has not yet been garbage collected, then at a next step 120, the memory analysis tool may analyze the collection (C) to determine the size of the collection.

At a next step 122, the size of collection (C) is compared to a threshold. The threshold may be predefined, may be constant, and/or may be a variable. If the size of the collection (C) is below the threshold, the tool may proceed to next step 130 to clear any previous report about collection C before returning to next step 112 to analyze the remaining collections from the queue (Q). However, if the size of the collection (C) is above a threshold, then the memory analysis tool may analyze the history of growth for the collection (C) to determine if the collection (C) is a memory leak, at a next step 124.

At a next step 126, the memory analysis tool may make a determination on whether or not the collection (C) is a memory leak. If the collection (C) is a memory leak, then at a next step 128, the collection (C) may be reported as a memory leak. If the collection (C) is not a memory leak, then at next step 130, the memory analysis tool may clear any previous memory leak report for collection (C) before returning to next step 112 to analyze the next collection from the queue (Q).

As can be seen from the example described in prior art FIGS. 1A and 1B, most memory leak analysis tools detect potential memory leaks by tracking Java collection objects and analyzing the growth history of the tracked collection objects. Thus, if a collection object is short-lived, the memory leak analysis tools may be unable to detect the collection object as a potential memory leak even if the collection object's memory consumption is growing each time a new collection object is created at the same allocation site. As a result, the memory analysis tool may never proceed to next step 128, since at next step 116, the collection object has already been garbage collected.

Increasing memory consumption is a "memory leak" problem that can cause serious negative financial impact. Consider the situation wherein, for example, a server application is servicing thousands of clients. In the first session, a temporary object may be created. Once the first session has terminated, the object may be garbage collected. However, due to a logical flaw in the application program, the content of the object from the first session may be copied into the object created in second session resulting in a memory footprint growth during the second session. Thus, even though an automatic memory management system may be employed to garbage collect the temporary object, the automatic memory management system is unable to resolve for the increasing memory consumption problem. Over time, the memory footprint may continue to grow causing deterioration in application performance and may even result in an application failure.

Although increasing memory consumption may occur in smaller applications, increasing memory consumption in long running applications, such as deployed web applications, is typically more severe, since the memory leaks accumulate over time. Also, increasing memory consumption may be harder to diagnose. The long running applications tend to be more complex. Also, since the deployed applications are serving customers, the developers usually do not have the luxury of stopping the application programs to analyze the cause of increasing memory consumption.

In one aspect of the invention, the inventors herein realized that increasing memory consumption is not limited to only collection classes (e.g., Java collection classes). Instead, increasing memory consumption seems to occur when arrays are being utilized in an application program, regardless if the array is created by a collection class. The inventors further realized that since each array in Java has a fixed size tracking the size of an array to identify increasing memory consumption may not be a possibility. Instead, the inventors realized that instead of tracking an array, memory consumption at an array allocation site might be monitored instead. As discussed herein, an allocation site refers to a location in the code of the application program where a new object may be created.

In accordance with embodiments of the present invention, a method for detecting sources of increasing memory consumption is provided. Embodiments of the invention also provide an algorithm for dynamically tracking the array sizes at array allocation sites within an application program to identify potential sources of memory leak. Embodiments of the invention further reduce the potential of false positives by incorporating an elapsed time factor to account only for growth in array sizes that may occur over a long time period.

In this document, various implementations may be discussed using Java as an example. This invention, however, is not limited to Java and may include any programming language that may employ arrays. In particular, automatic memory management is not required. Instead, the discussions are meant as examples and the invention is not limited by the examples presented.

In an embodiment of the invention, a method for detecting sources of increasing memory consumption is provided. The method may include identifying the potential sources of increasing memory consumption and analyzing the potential sources to determine whether or not a memory leak exists.

In an embodiment of the invention, as each new array is allocated at an allocation site, the memory consumption at an allocation site may be monitored. To determine memory consumption, each new array size is compared to the allocation site threshold value. The allocation site threshold value is updated with the size of the new array if the new array size is larger than the current allocation site threshold value. Thus, the allocation site threshold value represents the maximum size for an array that has been allocated at a specific allocation site. As a result, an increase in the allocation site threshold value may indicate that the memory consumption at an allocation site is growing.

In an embodiment of the invention, the method may also monitor the time when the allocation site threshold value may have last grown. In an example, if the allocation site threshold value grows in a given time period (e.g., current time period), the given time period may be designated as a growth period for the allocation site.

By analyzing the growth period pattern of an allocation site, potential memory leak may be identified. In an embodiment, to be reported as a suspected source of memory leak the growth period pattern may have to pass two threshold tests. In the first threshold test, the number of growth periods may have to be greater than a growth threshold. The growth threshold may be a predefined constant or may be dynamically adjusted according to a set of conditions.

The second threshold test may not be performed unless the first threshold test has been met, in an embodiment. In the second threshold test, the elapsed time between the current growth period and the previous growth period may be analyzed. If the elapsed time since the last growth period at an allocation site exceeds a time threshold, the algorithm may consider the second threshold test as not being met. By implementing the second threshold test, the number of false positives may be substantially reduced. In an example, allocation sites that may show some sign of increasing memory consumption may not actually be a potential source of memory leak if no growth has been observed over a significant amount of time.

If both threshold tests are passed, then the algorithm may identify the allocation site as a source of increasing memory consumption and may report the allocation site as a suspected source for a memory leak. In an embodiment, a set of stack traces may be collected if an allocation site is identified as a potential memory leak source in order to provide the developer with diagnostic data for debugging at a later date.

The features and advantages of the present invention may be better understood with reference to the figures and discussions that follow.

Figure 2A:
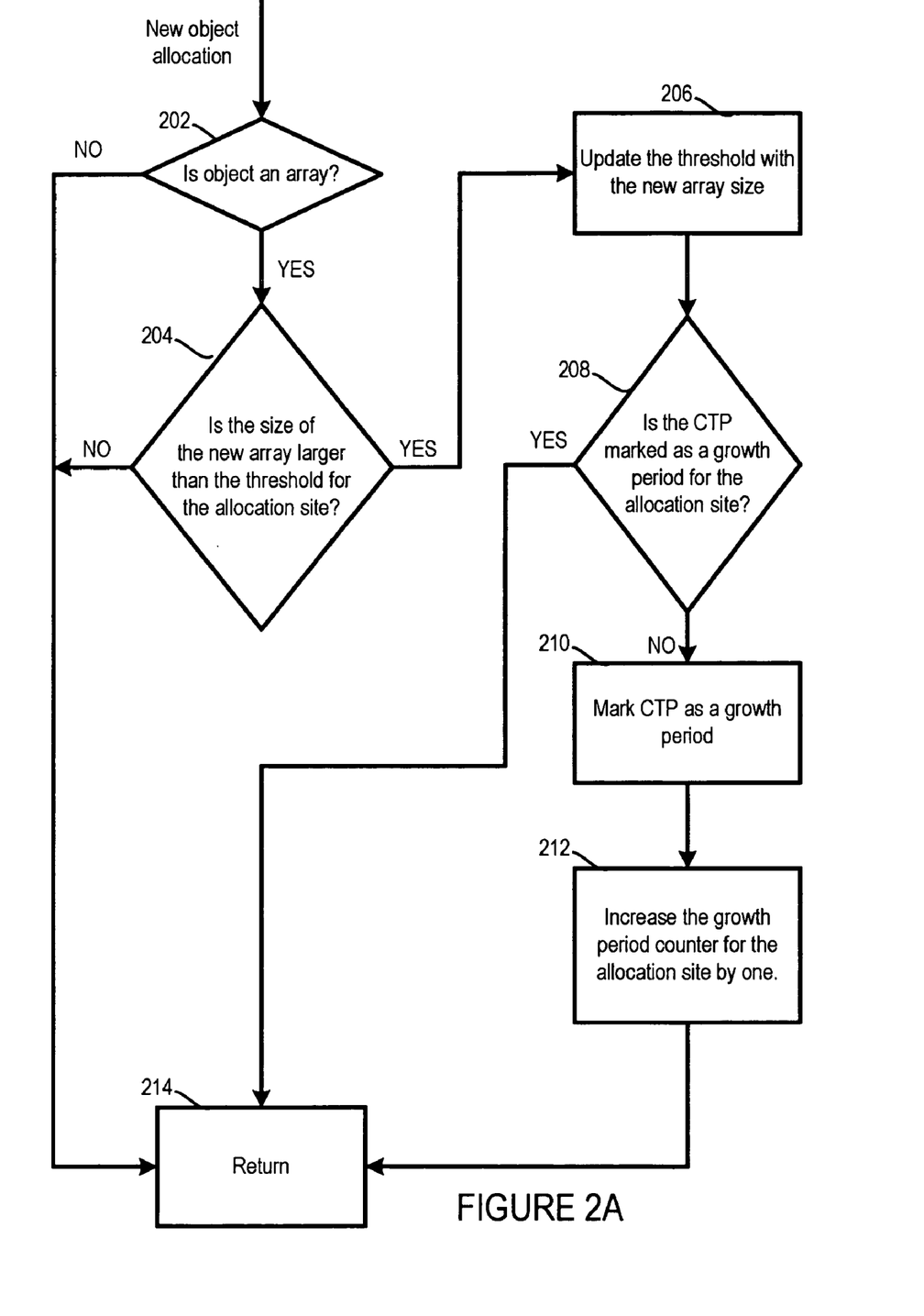
FIG. 2A shows, in an embodiment of the invention, a flow chart example of a way a memory analysis tool interfaces with the application by tracking memory consumption on an allocation site.

FIG. 2A shows, in an embodiment of the invention, a flow chart example of tracking memory consumption for an allocation site. Consider the situation wherein, for example, a new object allocation has occurred in the application program.

At a first step 202, the method may check to determine if the new object is an array. Since arrays may be employed to create a variety of different data structures, the invention may be employed to detect potential memory leaks in a variety of different application elements.

If the new object is not an array, then the method may proceed to a next step 214 to continue execution of the application program.

However, if the new object is an array, then at a next step 204, the size of the new array is compared against the threshold value of the allocation site.

If the size of the new array is not larger than the threshold value of the allocation site, then the method may proceed to next step 214 to continue executing the application program.

However, if the new array is larger than the threshold value of the allocation site, then at a next step 206, the threshold value is updated with the size of the new array. In an embodiment, the threshold value is the maximum array size that has been encountered at a particular allocation site. Since the threshold value is only replaced when a larger array size is encountered, the threshold value may only increase.

At a next step 208, the method may check to determine if the current time period (CTP) has already been marked as a growth period for the allocation site. In an embodiment, the execution time of the application program may be split into consecutive time periods, identified by natural numbers (i.e., 1, 2, etc.). The time periods may be either fixed or variable depending upon the implementation of the invention. For example, assume in this scenario that a current time period is defined as every 1 second. In a given second, one or more arrays may have been created in a specific allocation site. If during a current time period, the threshold value of the allocation site has already been adjusted upward and the current time period has already been marked as a growth period, then the method does not have to do further processing. Instead, the method may proceed to next step 214 to continue executing the application program.

However, if the current time period has not yet been marked as a growth period, and the threshold value of the allocation site has increased, then at a next step 210, the current time period is marked as a growth period for the allocation site. As discussed herein, a growth period refers to the time period during which the size of a new array is larger than the threshold value for an allocation site.

To keep track of the number of growth periods for a particular allocation site, a counter may be employed. At a next step 212, a counter may be increased by one each time a current time period for an allocation site is marked as a growth period.

Figure 2B:
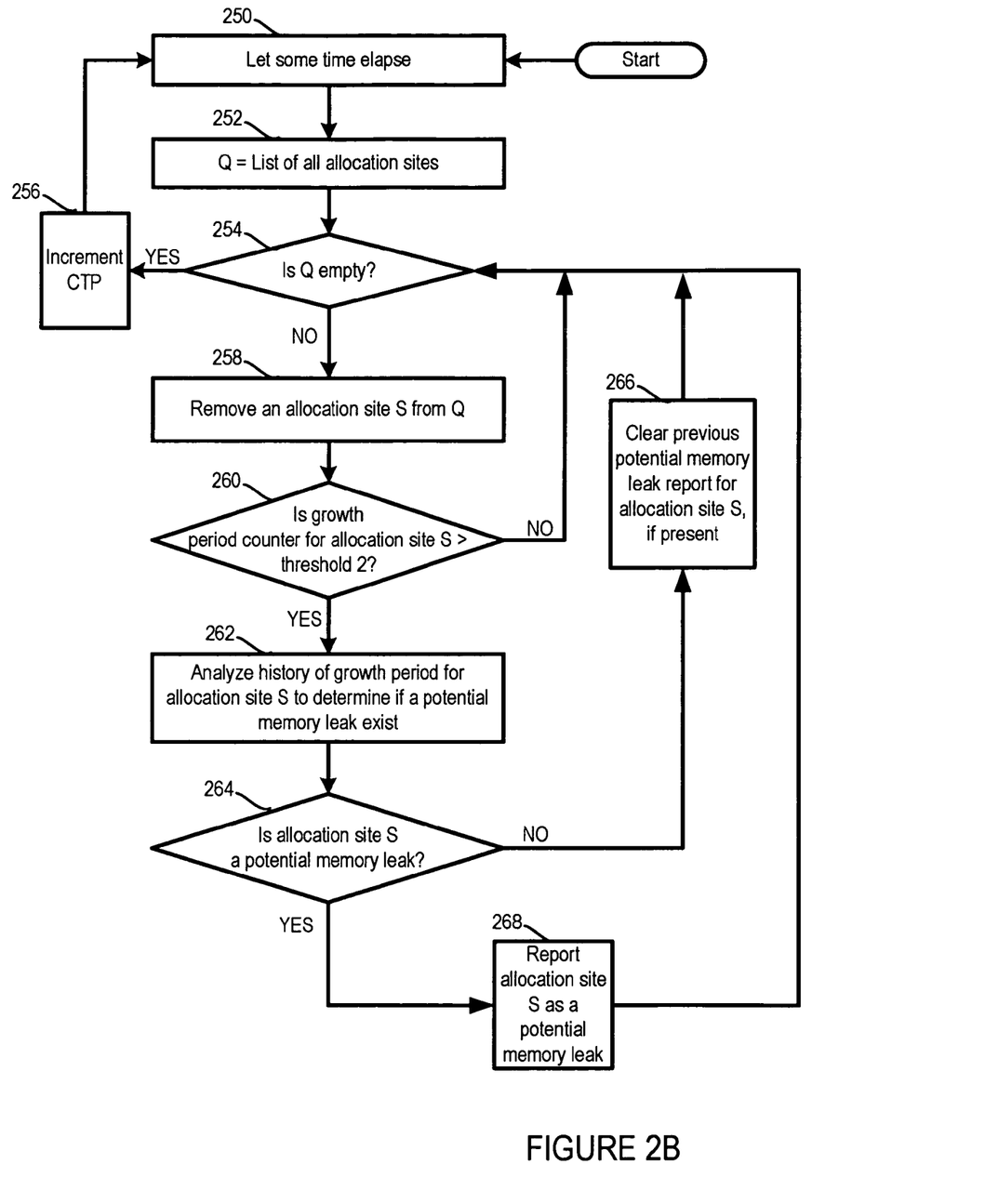
FIG. 2B shows, in an embodiment, a flow chart example of a method for identifying potential memory leak.

FIG. 2B shows, in an embodiment, a flow chart example of a method for identifying potential memory leak. In an embodiment, identifying potential memory leak may be performed by a memory consumption analysis tool. Since a memory consumption analysis tool may scan the allocation sites periodically for potential memory leak, some time may elapse between iterations, as shown in a next step 250.

At a next step 252, a list of allocation sites for the application program is copied into a queue (Q).

At a next step 254, the memory consumption analysis tool may check to determine if queue (Q) is emptied. In an example, the memory consumption analysis tool may check to determine if queue (Q) currently holds any allocation site (S).

If the queue (Q) is emptied, the current time period is increased by one, at a next step 256. In an embodiment, a counter may be employed to keep track of current time period. In an embodiment, once the counter of the current time period has been increased, no further check for potential memory leak is performed until the next time period.

However, if the queue (Q) is not emptied, then at a next step 258, an allocation site (S) is extracted for analysis and removed from queue (Q).

At a next step 260, the growth period counter for allocation site (S) is compared against a threshold 2 (i.e., growth threshold). In an embodiment, the threshold 2 (i.e., growth threshold) is configurable and may be a constant or a variable.

If the growth period counter for allocation site (S) is not greater than the threshold 2 (i.e., growth threshold), then the memory consumption analysis tool may return to next step 254 to analyze the next allocation site (S) in queue (Q).

However, if the growth period counter for allocation site (S) is greater than the threshold 2 (i.e., growth threshold), then at a next step 262, the history of the growth period for allocation site (S) may be analyzed to determine if a potential memory leak exist. Further discussion about the algorithms that may be implemented for analyzing the history of the growth period will be provided later in the discussion of the pseudo code.

Based on the analysis, at a next step 264, the memory consumption analysis tool may make a determination on whether allocation site (S) is a potential memory leak.

If the memory consumption analysis tool determines that increasing memory consumption is not occurring at allocation site (S) (e.g., allocation site (S) is not a potential memory leak source), then at a next step 266, the memory consumption analysis tool may clear previous potential memory leak reports for allocation site (S).

However, if the memory consumption analysis tool determines that increasing memory consumption is occurring at allocation site (S), then at a next step 268, the memory consumption analysis tool may report allocation site (S) as a potential memory leak. In an embodiment, a notification may be provided to an operator managing the deployed application program. With this notification the operator may be able to plan for possible application problems, such as slower performance and/or application failure. In an embodiment, a report detailing the potential problems may be provided in a diagnostic tool for the developers of the application program.

The memory consumption analysis tool for monitoring memory consumption for an allocation site in FIGS. 2A and 2B accounts for potential increasing memory consumption (e.g., memory leak) that may occur in both standard collection classes and in other classes by monitoring arrays. In the prior art, increasing memory consumption has been difficult to identify if the observed object had a short lifespan.

The method described in FIGS. 2A and 2B provide a lightweight solution for determining increasing memory consumption. In an embodiment, the method relies on a few variables (e.g., threshold value of an allocation site, a growth period counter, etc.) to keep track of how much and how often an allocation site may have grown over time. Also, as time progresses, the ability to determine whether or not an allocation site is a potential memory leak is refined as more data is gathered about the allocation site. Thus, the method provides a built-in mechanism (e.g., elapsed time) to substantially eliminate false positives.

A pseudo code example has been provided below to illustrate how the method described in FIGS. 2A and 2B may be implemented.

The method provides an algorithm for analyzing each new array that is created in the application. Since each array object has a fixed size, tracking array objects to determine increasing memory consumption is not helpful. However, analyzing the growth in size of each new array that may be created for a specific allocation site may be useful in identifying potential memory leak. In an embodiment, the algorithm may define each allocation site as a variable with an associated data structure, as shown in Pseudo Code Part 1

Pseudo Code Part 1:

```
class AllocationSite {                    //line 1
    int threshold1;                        //line 2
    int peakPeriod;                        //line 3
    int nGrowthPeriods;                    //line 4
    (optional) Set of STACK_TRACES;        //line 5
}                                          //line 6
```

In Pseudo Code Part 1, the data structure for allocation site (shown on line 1) may include a finite number of data elements.

In an embodiment, the allocation site variable may include the value of threshold 1 (shown on line 2). Threshold 1 (i.e., allocation site threshold value) represents the maximum size of the array that has been created at an allocation site. The value of threshold 1 (i.e., allocation site threshold value) may increase over time during the execution of an application program, in an embodiment.

In another embodiment, the allocation site variable may include the value of the peakPeriod (shown on line 3). The value for peakPeriod may represent the last current time period which was a growth period. In other words, the peakPeriod is the last time threshold 1 (i.e., allocation site threshold value) has increased.

In yet another embodiment, the allocation site variable may include the value of nGrowthPeriods (shown on line 4). The value for nGrowthPeriods may represent the number of times a growth period has occurred for the allocation site. In other words, the value for nGrowthPeriods is the growth period counter.

In yet another embodiment, the variable allocation site may also include a set of stack traces (shown on line 5). Stack traces may be collected to provide the developers with debugging information about the potential memory leak. Stack traces may provide the developers with a precise location where a logic flaw in the application program may be causing the potential memory leak. Since collecting stack traces may have the potential to consume a lot of the computer resources, stack traces may be collected only once during a growth period, in an embodiment. In another embodiment, stack traces may not be collected until an allocation site is determined to be a potential memory leak source.

The method described in FIG. 2A may be implemented as shown in Pseudo Code Part 2.

Pseudo Code Part 2:

```
void newArrayAllocation (int size, AllocationSite site) {   //line 7
    if (size > site.threshold1) {                            //line 8
        if (CTP > site.peakPeriod) {                         //line 9
            site.peakPeriod = CTP;                           //line 10
            site.nGrowthPeriods ++;                          //line 11
            if (site.nGrowthPeriods >= threshold3) {         //line 12
                site.COLLECT_STACKTRACE ( );                 //line 13
            }                                                //line 14
        }                                                    //line 15
```
```
        site.threshold1 = size;                              //line 16
    }                                                        //line 17
}                                                            //line 18
```

Pseudo Code Part 2 may be executed by an application thread each time a new array is allocated.

Line 7 describes what the algorithm does whenever a new array is created by an application, in an embodiment. The new array is described by an array size and is associated with an allocation site (i.e., allocation site variable as declared in line 1 of Pseudo Code Part 1). Line 7 is an example of an implementation of step 202 of FIG. 2A.

The algorithm may then compare the size of the new array against threshold 1 (as shown in line 8). Line 8 is an example of an implementation of step 204 of FIG. 2A.

If the size of the new array is greater than threshold 1 (i.e., allocation site threshold value), the threshold 1 may be updated with the new array size (as shown in Line 16). Line 16 is an example of an implementation of step 206 of FIG. 2A.

Besides updating threshold 1 (i.e., allocation site threshold value), the algorithm may also compare the current time period (CTP) against peakPeriod (as shown in Line 9). In other words, the algorithm is checking to make sure that the current time period has not already been marked as a growth period. Line 9 is an example of an implementation of step 208 of FIG. 2A.

If the current time period is greater then the peakPeriod, then the algorithm may set the peakPeriod to be the current time period (as shown in Line 10). In an example, the current time period is marked as a growth period. The algorithm may also increase the growth period counter (as shown in Line 11). Line 10 and line 11 are examples of implementations of steps 210 and 212 of FIG. 2A.

As mentioned above, stack traces collection may be a heavy consumer of computer resources. Thus, to minimize unnecessary resource drain, stack traces may be collected only if a potential memory leak is identified, in an embodiment. Lines 12 and 13 provide the conditions under which a set of stack traces may be collected. In an embodiment, the set of stack traces may be collected if the nGrowthPeriods is greater than or equal to a threshold 3 (i.e., stack trace threshold). Similar to the other thresholds, threshold 3 may be either a constant or a variable depending upon the implementation of the invention.

The method described in FIG. 2B may be implemented as shown in Pseudo Code Part 3. In particular, Pseudo Code Part 3 contains an example of simple implementations of steps 260 (line 20) and 262 (line 21) of FIG. 2B.

Pseudo Code Part 3:

```
boolean isSiteLeaking (AllocationSite entry) {              //line 19
    if (entry.nGrowthPeriods >= threshold2 &&               //line 20
        CTP - entry.peakPeriod < threshold4) {              //line 21
        return true;                                        //line 22
    } else {                                                //line 23
        return false;                                       //line 24
    }                                                       //line 25
}                                                           //line 26
```

Pseudo Code Part 3 may be executed by a thread whenever a particular allocation site need to be analyzed to determine if a potential memory leak may exist. The determination of whether or not an allocation site is a suspected source of memory leak may be based on the growth pattern of the growth period of the allocation site.

As shown in lines 20 and 21 above, the algorithm may perform two comparisons. The first comparison is to determine if the nGrowthPeriods is greater than or equal to a threshold 2 (i.e., growth threshold). In an example, new arrays being created at an allocation site are continually increasing in size resulting in a continual increase in the value of the threshold 1 (i.e., allocation site threshold value). As the value of threshold 1 (i.e., allocation site threshold value) increases, the growth period counter may also increase accordingly.

If the nGrowthPeriods is greater than or equal to the value of the threshold 2 (i.e., growth threshold) then a second threshold test may have to be met before an application site is reported as a potential memory leak source. In the second comparison, the algorithm may check to determine if the difference between the current time period (CTP) and the peakPeriod is less than a threshold 4 (i.e., elapse time threshold). In other words, the algorithm is taking into account an elapse time factor, which may be a function of the amount of time that may have elapsed since the last growth period. By implementing an elapse time factor, the algorithm may substantially reduce the amount of false positives that may occur. In an example, an allocation site may have been initially reported as a potential memory leak. However, as time progresses, the size of the new arrays being created at the allocation site may not be growing. Thus, each new time period may be further apart from the last growth period. As a result, better identification of potential memory leak sources may be achieved as time progresses during the execution of an application program.

As can be appreciated from the forgoing, one or more embodiments of the present invention provide an efficient method for detecting sources of increasing memory consumption. The method may be implemented as a lightweight application (e.g., memory consumption analysis tool) that may be utilized in performing unobtrusive memory diagnostics of long running applications that are serving critical business functions (e.g., actively serving customers) without negatively impacting the performance of the main application programs.

By focusing on monitoring arrays and their associated allocation sites, the method provides a more comprehensive memory diagnostic tool in term of the different data structures that may cause potential memory leak. The method also provides timely and detailed reports to appropriate parties that may have an interest in the maintenance of an application. Further, the method may be implemented automatically allowing for a more efficient memory diagnostics tool with substantially little or no possibility for human errors. The efficient method of detecting increasing memory consumption described above provide a cost effective and efficient method of performing a tedious and time consuming task that have been expensive and difficult to implement in the prior art.

While this invention has been described in terms of several preferred embodiments, there are alterations, permutations, and equivalents, which fall within the scope of this invention. Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A method for detecting increasing memory consumption of an application program in a computer system, comprising:
   monitoring memory consumption at an allocation site, said allocation site being a location in said application program where a new object is created;
   updating an allocation site threshold value each time said memory consumption at said allocation site increases;
   splitting an application execution time into time periods;
   increasing a growth period counter each time said allocation site threshold value increases for said allocation site in a current time period, wherein the growth period counter indicates a number of growth periods, where each of the growth periods is a respective one of the time periods of the application execution time in which said allocation site threshold value increased;
   comparing said growth period counter to a growth threshold;
   if said growth period counter is greater or equal to said growth threshold, computing an elapse time, said elapse time being a difference between a current growth period and a previous growth period;
   comparing said elapse time to a time threshold; and
   if said elapse time is less than said time threshold, reporting said allocation site as a potential source of said increasing memory consumption.

2. The method of claim 1 wherein said monitoring at said allocation site includes comparing a size of the new object against said allocation site threshold value.

3. The method of claim 1 wherein said current time period is one of a plurality of consecutive time periods during execution of said application program.

4. The method of claim 3 wherein said plurality of consecutive time periods is a set of fixed time periods.

5. The method of claim 3 wherein said plurality of consecutive time periods is a set of variable time periods.

6. The method of claim 1, wherein the method is performed by a memory consumption analysis tool, said memory consumption analysis tool being configured to scan said allocation site repeatedly to identify potential increasing memory consumption.

7. The method of claim 1 wherein said computing of said elapse time is performed by analyzing a history of a set of growth periods for said allocation site.

8. The method of claim 1 further including, if said elapse time is less than said time threshold, clearing previous potential memory leak reports for said allocation site.

9. The method of claim 1 further including notifying an operator of said application program about said increasing memory consumption.

10. The method of claim 1, wherein updating said allocation site threshold value comprises:
    comparing a size of said new object to the allocation site threshold value; and
    increasing the allocation site threshold value in response to the size of said new object being greater than said allocation site threshold value.

11. An article of manufacture comprising a program storage medium having computer readable code embodied therein, said computer readable code being configured to detect increasing memory consumption of an application program in a computer system, said computer readable code upon execution in the computer system causing the computer system to:

monitor memory consumption at an allocation site, said allocation site being a location in said application program where a new object is created;
update an allocation site threshold value each time said memory consumption at said allocation site increases;
increase a growth period counter each time said allocation site threshold value increases for said allocation site in a current time period, wherein the growth period counter indicates a number of growth periods, where each of the growth periods is a respective one of plural time periods of an application execution time in which said allocation site threshold value increased;
compare said growth period counter to a growth threshold;
compute, if said growth period counter is greater or equal to said growth threshold, an elapse time, said elapse time being a period of time between a current growth period and a previous growth period;
compare said elapse time to a time threshold; and
report, if said elapse time is less than said time threshold, said allocation site as a potential source of said increasing memory consumption.

12. The article of manufacture of claim 11 wherein said monitoring at said allocation site includes comparing a size of said new object against said allocation site threshold value.

13. The article of manufacture of claim 12, wherein updating said allocation site threshold value comprises increasing said allocation site threshold value in response to the size of said new object being greater than said allocation site threshold value.

14. The article of manufacture of claim 11 wherein said current time period is one of a plurality of consecutive time periods during execution of said application program, said plurality of consecutive time periods being one of a fixed set of time periods and a variable set of time periods.

15. The article of manufacture of claim 11 wherein said computer readable code is part of a memory consumption analysis tool, said memory consumption analysis tool being configured to scan said allocation site repeatedly to identify potential increasing memory consumption.

16. The article of manufacture of claim 11 wherein said growth threshold is configurable.

17. The article of manufacture of claim 11 wherein said computing of said elapse time is performed by analyzing a history of a set of growth periods for said allocation site.

18. The article of manufacture of claim 11 wherein said computer readable code upon execution causes the computer system to further clear, if said elapse time is less than said time threshold, previous potential memory leak reports for said allocation site.

19. The article of manufacture of claim 11 wherein said computer readable code upon execution causes the computer system to further notify an operator of said application program about said increasing memory consumption.

20. The article of manufacture of claim 11 wherein said computer readable code upon execution causes the computer system to further provide a set of reports about said increasing memory consumption, said set of reports including a set of stack traces, said set of stack traces being collected to provide detail about a logic flaw in allocation sites of said application program.

21. An article of manufacture comprising a program storage medium having computer readable code embodied therein, wherein the computer readable code upon execution causes a computer system to:
monitor memory consumption at an allocation site of an application program where a new object is created;
increase an allocation site threshold value in response to an increase in the memory consumption;
determine a number of growth periods based on a growth period counter, wherein each of the growth periods is a corresponding time period of plural time periods of an execution time of the application program during which the allocation site threshold value is increased, and wherein the growth period counter is increased for each growth period;
in response to detecting the number of growth periods exceeding a growth threshold, determine whether an elapsed time between a current one of the growth periods and a previous one of the growth periods is less than a time threshold; and
in response to determining that the elapsed time is less than the time threshold, indicate the allocation site as a potential source of increasing memory consumption.

22. An article of manufacture comprising a program storage medium having computer readable code embodied therein, wherein the computer readable code upon execution causes a computer system to:
monitor memory consumption at an allocation site of an application program where a new object is created;
increase an allocation site threshold value in response to an increase in the memory consumption, wherein increasing the allocation site threshold value comprises:
comparing a size of the new object to the allocation site threshold value;
wherein the allocation site threshold value is increased in response to the size of the new object being greater than the allocation site threshold value;
determine a number of growth periods, wherein each of the growth periods is a corresponding time period of plural time periods of an execution time of the application program during which the allocation site threshold value is increased;
in response to detecting the number of growth periods exceeding a growth threshold, determine whether an elapsed time between a current one of the growth periods and a previous one of the growth periods is less than a time threshold; and
in response to determining that the elapsed time is less than the time threshold, indicate the allocation site as a potential source of increasing memory consumption.

* * * * *